Oct. 20, 1964     R. J. SEETHALER     3,153,328
BRAKING SYSTEM FOR VEHICLES
Original Filed Aug. 30, 1954
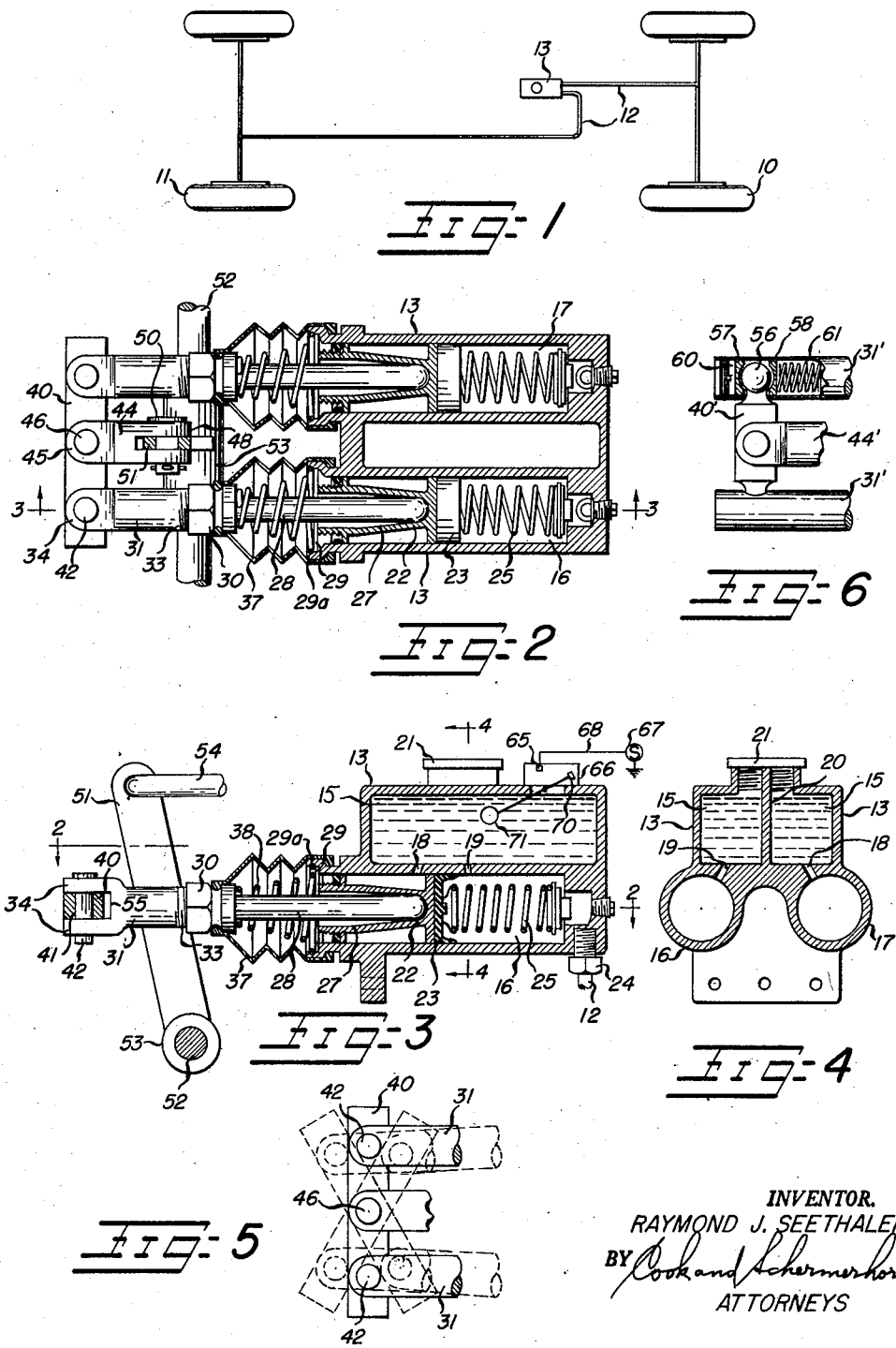
INVENTOR.
RAYMOND J. SEETHALER
BY Cook and Schermerhorn
ATTORNEYS

United States Patent Office 3,153,328
Patented Oct. 20, 1964

3,153,328
BRAKING SYSTEM FOR VEHICLES
Raymond J. Seethaler, 2044 N. Willis Blvd.,
Portland 17, Oreg.
Continuation of application Ser. No. 452,830, Aug. 30, 1954. This application Oct. 23, 1959, Ser. No. 850,010
1 Claim. (Cl. 60—54.6)

This invention relates to improvements in braking systems for motor vehicles, and more particularly to a pressure equalizing unit for separate fluid systems.

This application is a continuation of application Serial No. 452,830, filed August 30, 1954, now abandoned, for Braking System for Vehicles.

Hydraulic braking systems on vehicles have met with commercial success, due to the fact that, by the principle of hydraulics, the column of fluid transmits the pressure applied to the brake pedal to all the wheel cylinders with an equal and undiminished force. However, as frequently happens, one of the lines to the wheel cylinders, or the wheel cylinders themselves, produces a leak whereby the entire braking system is rendered inoperative and no means remain to stop the vehicle except for the retarding force which may be available through a hand brake or the running gears.

Devices have been proposed for the purpose of providing separate fluid brake means for separate sets of vehicle wheels, so that in the event of loss of a part of the fluid means, the entire braking system will not be rendered inoperative. Some of the devices have proposed equalizing means which are operable by a common lever actuated by the brake pedal, but these devices have not met with commercial success because of inherent structural faults. A disadvantage inherent in some of the systems is that the equalizing means exert lateral stresses on the piston rods which operate the master cylinder plungers, and unless means are provided to compensate for such lateral stresses the rods are likely to jam or otherwise bind in bushings or other sealing means on the master cylinder. Another disadvantage of such devices is that the leverage applied by link arrangements to individual piston rods in the master cylinder varies in force and the fluid pressure in the different lines thus is not equal, thereby defeating the very purpose of equalization for which hydraulic systems were designed.

It is a principal object of the present invention to provide a dual hydraulic braking system for vehicles having improved equalizing means, and more particularly to provide a structure having equalizing means adjustable automatically to impart an equal pressure to said dual braking system.

Another object of the invention is to provide a master cylinder structure having means to counteract lateral stresses which may be applied by the equalizing linkage means during a braking operation to obviate any possibility of binding or jamming of engaging parts.

Further objects are to provide a brake structure which is simple in construction, economical to manufacture and reliable in operation.

The instant invention is designed to provide separate braking systems for separate sets of wheels of a vehicle, which are reliable in operation and which maintain an equal pressure in each system during a braking operation. Independent cylinder and piston means are provided for each system, and the two pistons are actuated by piston rods connected adjacent opposite ends of a common equalizer bar. The equalizer bar is pivotally connected at its center to a brake pedal operated link, and is adapted to pivot on said link when the pistons advance in their respective cylinders an unequal distance due to an unequal volume of fluid in the two separate systems. The piston rods are connected to the equalizer bar at points equally spaced from the operating link and accomplish advantages in conjunction with the piston construction not heretofore achieved.

The invention will be better understood and additional advantages will become apparent from the following description taken in connection with the accompanying drawings which illustrate preferred forms of the device. It is to be understood, however, that the invention may take other forms, and that all such modifications and variations within the scope of the appended claims which will occur to persons skilled in the art are included in the invention.

In the drawings:

FIGURE 1 is a diagrammatic view of the present braking system as applied to a motor vehicle;

FIGURE 2 is a sectional view of the master cylinders, together with the equalizing means, taken on the line 2—2 of FIGURE 3;

FIGURE 3 is a sectional view taken on the line 3—3 of FIGURE 2;

FIGURE 4 is a sectional view taken on the line 4—4 of FIGURE 3;

FIGURE 5 is a fragmentary top plan view of the equalizing means, showing in dotted lines different positions thereof; and FIGURE 6 is a fragmentary top plan view of a modified form of connection for the equalizing means.

Referring to the drawings, FIGURE 1 is a diagrammatic view of a vehicle having front wheels 10 and rear wheels 11. The wheels are equipped with the usual wheel cylinders, not shown, and brake lines 12 establish fluid connection between said wheel cylinders and the master cylinders 13 having means to be described which supply fluid separately to the front set of wheels 10 and the rear set of wheels 11.

Master cylinders 13 comprise reservoirs 15, 15 and a pair of cylinders 16 and 17 having ports 18 and 19 communicating with the reservoirs for receiving fluid therefrom. The reservoirs 15, 15 have a common dividing wall 20, FIGURE 4, which extends the full height of the reservoirs, and, in addition, extends into filling cap 21, whereby each cylinder has a fluid supply independent of the other cylinder. Slidable in each of the cylinders 16 and 17 is a piston 22 and cup 23 which is adapted to eject fluid through suitable connections 24 into brake lines 12, piston 22 being biased to their left-hand rest position by return springs 25.

Each of pistons 22 has a recess 27 tapered inwardly from its rearward end adapted to receive a thrust pin or piston rod 28, the pistons 22 being held from displacement by washers 29 held in place by lock springs 29a as in conventional devices. Piston rods 28 are each provided with an interiorly threaded coupling 30 to which is adjustably connected an extension rod 31 having one end threaded at 33 for engagement with coupling 30 and being bifurcated to form apertured U-shaped arms 34 at the other end. The device is provided with a flexible dust cap 37 and an auxiliary return spring 38 which is engaged between coupling 30 on the piston rod and washer 29.

The bifurcated ends of extension rods 31 pivotally engage an equalizing bar 40 having apertures 41 to receive pivot pins 42. A central operating or tension link 44 having bifurcated arms 45 also pivotally engages the equalizer bar 40 and is connected therewith by means of a pivot pin 46 intermediate the connections for the extension rods 31. The two connections for the extension rods 31 are equally spaced from the connection for the operating link 44.

Central link 44 is provided with a second pair of bifurcated arms 48 on the end opposite from and at right angles to the bifurcated arms 45. Pivotally mounted between bifurcated arms 45 by pivot pin 50 is an upstanding lever 51. The lower end of lever 51 is pivotally mounted on a horizontal rod 52 by means of a bearing 53. A rod 54 actuated by the brake pedal is connected to the upper end of lever 51 to move said lever about its bearing in a clockwise direction when the brake pedal of the vehicle is moved downwardly in a braking operation. Movement of lever 51 around its bearing 53 in a clockwise direction causes equalizer bar 40 to move to the right, as viewed in the drawings, to actuate the pistons in the two cylinders for a braking operation.

The connections between the equalizer bar 40 and the extension rods 31, and between the equalizer bar 40, the operating link 44 and the lever 51 have a slight amount of play. The tapered recesses in the pistons 22 and the pivotal connections permit the outer ends of the piston rods to rock in all lateral directions, the whole equalizer bar assembly moving slightly from side to side or in a vertical direction, or, more specifically, it has freedom of movement in any radial direction of a circle having an axis parallel to said piston rods.

When the volumes of fluid in the two systems are equal and force is applied to the brake pedal, the equalizer bar maintains a position at right angles to the extension rods 31 as the pistons 22 move into the master cylinders. When the volumes of fluid are unequal in the two systems, one piston advances ahead of the other to cause the equalizer bar to assume a more acute angle with respect to the extension rods. In this position of the equalizer bar, the piston rods and their extension rods move out of parallel relation and tend to converge toward their outer ends, as seen in dotted lines in FIGURE 5. A slight lateral force is thus imposed on the piston during a braking action, but, due to the design of the parts and especially the freedom of movement of the piston rods in tapered recesses 27 of the piston, the lateral forces produce no appreciable resistance to the braking action. As explained hereinbefore, the outer ends of the piston rods are free to move in lateral directions relative to the master cylinders, and when the rods converge toward their outer ends, as when the equalizer bar assumes an acute angle therewith, there is no possibility of binding or jamming of the parts, and movement of the piston rods into the two cylinders with equal force is insured during each braking operation. Furthermore, the play in the connections at the equalizer bar 40 and the lever 51 permits vertical tilting of the piston rods and connected structure caused by clockwise rotation of lever 51.

As the connections between the equalizer bar 40 and the two extension rods 31 are equally spaced from the connection between the equalizer bar and the actuating link 44, an equal force is applied to each of the pistons during a braking operation, regardless of the angular position of the equalizer bar. This function is accomplished because the portions of the equalizer bar on each side of the connection for the actuating link 44 form lever arms of equal length for applying leverage to each piston rod. By such structure, each of the fluid systems applies equal braking force to each set of wheels. If one of the systems should become inoperative, the other system is available to apply a braking action to two wheels. Furthermore, the individual fluid supply occasioned by the dividing wall 20 prevents damage to the whole system in the event foreign matter gets into one of the systems.

The slots between bifurcated arms 34 on the extension rods 31 are of a predetermined depth so that the bottom walls 55 thereof serve as abutments for the respective ends of the equalizer bar to limit extreme angular positions of the bar.

Referring to FIGURE 3, the present brake system may comprise fluid level indicating means for each reservoir for warning the driver when the fluid level in the reservoirs has fallen below a predetermined height. The indicating means for each reservoir comprises a contact 65 mounted in a housing 66 formed on the reservoir. Contact 65 is electrically connected to a dash light 67 by means of wire 68 and is adapted to be engaged by a pivotal contact arm 70 electrically connected to the vehicle battery and actuated by a float 71. When the fluid level in the reservoir falls below a certain height, float 71 moves arm 70 into engagement with contact 65 to energize the dash light 67. Preferably, a gauge is provided in each of the two reservoirs 15.

FIGURE 6 shows a modified form of connection between an equalizer bar 40' and extension rods 31'. In this embodiment equalizer bar 40' has ball ends 56, each of which is received in a socket formed by a pair of glands 57 and 58 mounted in each extension rod 31'. The end of each extension rod 31 is interiorly threaded to receive a nut 60 for holding the gland 57 in place, gland 58 being held in engagement with ball 56 by a spring 61. Similar to the FIGURE 1 embodiment, the connections between the equalizer bar 40' and the extension rods 31' are equally spaced from the connection between the equalizer bar and the actuating link 44' and provide for the equal application of pressure to each braking system.

Having now described my invention and in what manner the same may be used, what I claim as new and desire to protect by Letters Patent is:

In a braking system for motor vehicles, a master brake unit having a pair of cylinders and pistons for applying fluid pressure to individual sets of brake systems, said pistons having rearwardly faced tapered recesses, piston rods having one end engageable in said recesses for actuating said pistons, a transverse equalizer bar mounted on the other end of said piston rods by pivotal connections adjacent each end thereof, a tension link pivotally connected directly to said equalizer bar at a point intermediate said piston rod connections and equally spaced therefrom, and an upstanding lever pivotally connected to the vehicle chassis and pivotally connected to said tension link, said tension link having freedom of movement laterally to follow the arcuate movement of said lever, said equalizer bar being arranged to assume an acute angle relative to said piston rods when one of said pistons advances ahead of said other piston and said piston rods in the angled positions of said equalizer bar being rearwardly convergent, said one end of said piston rods engageable in said tapered recesses being free to pivot in said recesses to permit said convergent movement of said piston rods, the pivotal connections on the piston rods, equalizer bar, tension link, and the upstanding lever having sufficient play to permit free motion of said equalizer bar in any radial direction of a circle having an axis parallel to said piston rods.

References Cited in the file of this patent

UNITED STATES PATENTS

| | | |
|---|---|---|
| 2,131,459 | Weatherhead | Sept. 27, 1938 |
| 2,247,827 | Wegmann | July 1, 1941 |
| 2,284,669 | Masteller | June 2, 1942 |

FOREIGN PATENTS

| | | |
|---|---|---|
| 167,002 | Switzerland | Apr. 16, 1934 |
| 309,470 | Great Britain | Apr. 11, 1929 |
| 673,487 | France | Oct. 8, 1929 |